Nov. 24, 1953

E. J. DUCKETT ET AL 2,660,666

SECRECY TRANSMISSION SYSTEM

Filed Jan. 5, 1950

WITNESSES:

H. F. Susser

Marcus W. Dodd

INVENTORS
George A. Klotzbaugh
and Edward J. Duckett.
BY

Hyman Diamond
ATTORNEY

Patented Nov. 24, 1953 2,660,666

UNITED STATES PATENT OFFICE 2,660,666

SECRECY TRANSMISSION SYSTEM

Edward J. Duckett and George A. Klotzbaugh, Pittsburgh, Pa., assignors to Westinghouse Electric Corporation, East Pittsburgh, Pa., a corporation of Pennsylvania Application January 5, 1950, Serial No. 136,996

8 Claims. (Cl. 250—6)

Our invention relates to signaling systems, and more particularly to secret signaling systems.

According to the teachings of the prior art of which we are aware, secret signaling systems have been built which are capable of transmitting messages by encoding the messages. However, encoding the messages at the transmitting station and decoding them at the receiving station is a slow and laborious process.

Other systems have been devised wherein the party transmitting speaks into a microphone, and noise is then added to obscure the intelligence. However, these do not provide for complete secrecy or else they are not readily intelligible to friendly stations.

It is, accordingly, an object of our invention to provide a radio telephone system whereby messages may be transmitted and received without allowing enemy monitors to comprehend the message being sent and whereby the transmissions can be easily understood by friendly stations.

An ancillary object of our invention is to provide better apparatus for combining noise modulations with signal modulations.

A further ancillary object of our invention is to provide apparatus for separating noise modulations from signal modulations.

An additional object of our invention is to provide apparatus for combining signal modulations with noise modulations wherein the carrier wave is suppressed.

In accordance with our invention we provide a system including a magic tee. A signal modulated carrier is caused to enter one branch of the tee and a noise modulated carrier to enter another branch in such manner that the signals are combined to produce one set of oscillations in a third branch, and another set of oscillations in a fourth branch. The oscillations from the third and fourth branches are transmitted independently to a receiving station. The oscillations from the first output branch of the magic tee at the transmitting station are caused to enter the second input branch of the magic tee at the receiving station, and the oscillations emitted from the second output branch of the magic tee at the transmitting station are caused to enter the first input branch of the magic tee at the receiving station. The first output branch and the second output branch of the magic tee at the receiving station are so chosen that the oscillations on entering those branches will be so combined that only a signal modulated carrier will appear in a second ouput branch, and only a noise modulated carrier will appear in a first output branch.

Each of the two series of oscillations which travel between the two stations will contain a carrier wave and at least two side bands. In accordance with another aspect of our invention, we have provided apparatus whereby the carrier wave may be eliminated, thus leaving only the two principal side bands. The elimination of the carrier wave tends to make our procedure less obvious to the enemy personnel which may happen to be monitoring our transmissions.

It is also practicable to eliminate one of the side bands thereby making the transmission even more difficult to decipher by an enemy station by methods well known in the art.

The novel features which we consider characteristic of our invention are set forth with more particularity in the appended claims. The invention, however, with respect to both the organization and the operation thereof, together with other objects and advantages may be best understood from the following description of specific embodiments when read in connection with the accompanying drawing, in which:

Figures 1, 2:
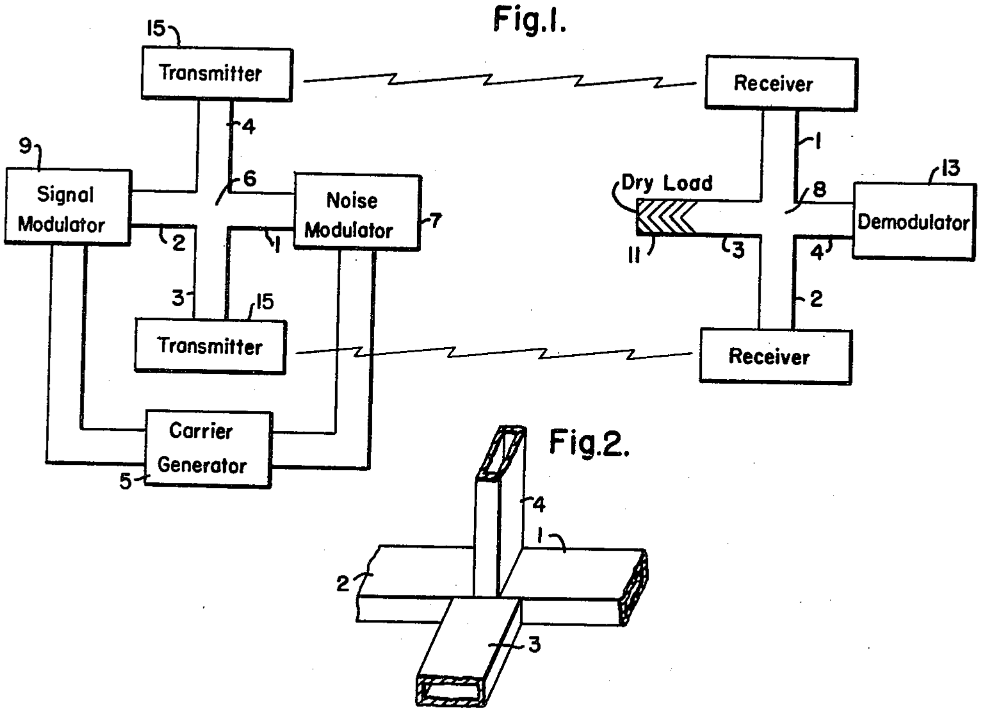
Figure 1 is a schematic diagram of apparatus embodying our invention.
Figure 2 is a perspective view of a magic tee which is employed in one embodiment of our invention.

In accordance with our invention, we provide a system including a magic tee having four branches—a first and a second input branch and a first and a second output branch. The magic tee is a system of wave guides so constructed that when one set of oscillations is caused to enter a first input branch 1, and another set of oscillations is caused to enter a second input branch 2, the electric field strength of oscillations leaving a first output branch 3 will be substantially proportional to the vector sum of the strengths of the electric field which entered the second branch 2, and the field strength of the oscillations which entered the first branch 1; and the field strengths of the oscillations leaving the second output branch 4 will be substantially proportional to the vector difference between the electric field strength of the oscillations entering the first input branch 2, and the electric field strength of the oscillations entering the first input branch 1. This is expressed mathematically by the equation:

$$E_4=\frac{1}{\sqrt{2}}(E_1-E_2)$$

and $$E_3=\frac{1}{\sqrt{2}}(E_1+E_2)$$

where $E_3$ is the electric field strength in the first output branch 3, $E_1$ is the electric field strength in the first input branch 1, $E_2$ is the electric field strength in the second input branch 2, and $E_4$ is the electric field strength in the second output branch 4.

The properties just described are employed in transmitting in accordance with one embodiment of our invention. However, there are other properties of the magic tee which make it also valuable in receiving transmissions from another magic tee. This property is substantially as follows: If signals are caused to enter the first and second input branches of a magic tee at a receiving station, the electric field strength produced in the second output branch will be substantially equal to $(E_4-E_3)$ which is proportional to $(E_1+E_2)-(E_1-E_2)=2E_2$ and the potentials produced in the first input branch will be substantially equal to $(E_4+E_3)$, which is proportional to $(E_1+E_2)+(E_1-E_2)=2E_1$. From these equations, it will be seen that if a signal modulated carrier is caused to enter the second input branch 2 and a noise modulated carrier is caused to enter a first input branch 1, a separate set of oscillations will come out of each of the first output branch 3 and the second output branch 4, providing, of course, that the phases of the carrier waves entering the two branches are the same. If the oscillations which are emitted through the second output branch 4 of the first magic tee are caused to enter the first input branch 1 of a second magic tee, and those oscillations emitted from the first output branch 3 of the first magic tee are caused to enter the second input branch 2 of the second magic tee, the first output branch of the second magic tee will emit only noise modulated oscillations, and the second output branch of the second magic tee will emit only signal modulated oscillations.

We, therefore, provide a transmitting station comprising a first magic tee 6. A carrier generator 5 is connected through a noise modulator 7 to the first input branch of the first magic tee and through a signal modulator 9 to the second input branch 2 of the first magic tee. Two different sets of signals will appear at the first and second output branches 3, 4 of the first magic tee. The oscillations emitted from the first output branch 3 of the first magic tee will contain a carrier wave and two principal side bands. In a like manner, the oscillations emitted from the second output branch 4 will also contain a carrier and two principal side bands.

If the oscillations emitted from the first and second output branches of the first magic tee 6 are so transmitted that they are kept separate and thereby caused to enter the second and first input branches respectively, of a second magic tee 8, they will be caused to combine in such a manner that the oscillations emitted from a first output branch 1 of the second magic tee 8 will contain only the noise modulations, while those oscillations emitted from the second output branch of the second magic tee 8 will contain only signal modulations. A dry load 11 is, therefore, inserted in the first output branch 3 of the second magic tee 8 to absorb the oscillations therein, and apparatus for deriving the information from the signal modulated oscillations, such as a demodulator 13, is attached to the second output branch of the magic tee.

Transmitting apparatus 15 can be attached to the two output branches of the first magic tee 6 which is at the transmitting station to change the frequency of the waves transmitted. This change in frequency could be accomplished in several ways which are known in the art such as by beating oscillations of a lower frequency against the output signal from the first magic tee. This assures a higher degree of secrecy by making it more difficult for the enemy to obtain the transmissions. With the two sets of oscillations being transmitted on different frequencies, the enemy monitors will be unable to obtain any information unless they have apparatus similar to ours and know which frequencies are being employed. Should enemy monitors receive only the oscillations from one of the output branches 3 or 4 of the transmitting magic tee 6, they will find difficulty in deciphering the transmission because the signal will be masked by the noise modulations. To increase the secrecy, it is also desirable to make the noise modulations stronger than the signal modulations thus insuring that the signal modulations are obscured.

It is preferable that both channels have the same overall time delay. If this requirement is not met, the oscillations entering the receiving station will probably not cancel out to produce an intelligible transmission.

If the overall time delays of the channels are not the same, this can be corrected by the use of phase shifters in the receiving apparatus. If, because of difference in antenna gain or small differences in wave guide circuits, the magnitude of the two input signals are not correct, variable attenuators can be used. In practice a phase shifter and an attenuator would probably be used in one of the two input arms 1 or 2 of the second magic tee 8 which is at the receiving station.

While in accordance with the specific aspects of our invention a magic tee is utilized, our invention in its broader aspects contemplates the inclusion of any hybrid junction in the systems of the type disclosed herein.

It is possible that an enemy observer might notice the carrier wave with the two principal side bands and thereby guess what is happening should he employ a spectrum analyzer. It is, therefore, desirable to remove the carrier wave and perhaps also one of the side bands.

Figure 3:
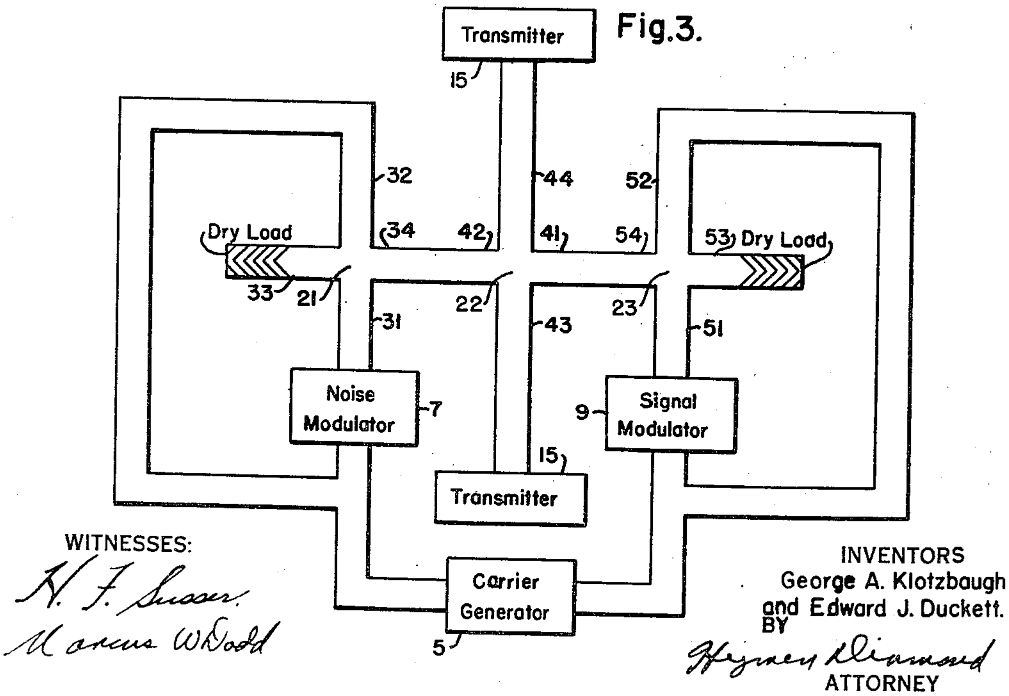
Figure 3 is a schematic diagram of one embodiment of our invention wherein the carrier wave is eliminated.

We have shown in Figure 3 apparatus embodying our invention whereby the carrier is suppressed. First, second and third magic tees 21, 22, 23 are employed. The second output branch 34 of the first magic tee 21 is connected to the second input branch 42 of the second magic tee 22. The first input branch 41 of the second magic tee is connected to the second output branch 54 of the third magic tee 23. The first magic tee 21 has a dry load connected to its first output branch 33, and a carrier generator 5 connected directly to its second input branch 32 and through a noise modulator 7 to its first input branch 31. The second magic tee 22 has a transmitter 15 connected to its second output branch 44, and a transmitter 15 connected to its first output branch 43. The third magic tee 23 has a dry load connected to its first output branch 53 and is connected to the aforementioned carrier generator 5 through a signal modulator connected to its first input branch 51, and its second input branch 52 is connected directly to the carrier generator 5. The oscillations leaving the output branches 43, 44 of the second magic tee 22 will be similar to the oscillations which were emitted from the output branches of the first transmitter described except that the carrier will have been suppressed.

It will be noted from the theoretical discussion above that if the three magic tees are connected together as described and a signal modulator which is coordinated with the signal modulator connected to the first branch of the third magic tee is connected between the first input branch of the first magic tee and the carrier generator instead of the noise modulator, the oscillations emitted from the output branches of the second magic tee will contain only the signal modulated oscillations and no carrier wave. We are thus able to eliminate the carrier wave from a signal transmission which is advantageous in other applications as well as a secrecy system.

In accordance with another embodiment of our invention, a carrier may be suppressed by causing a signal modulated carrier to enter a first input branch of a single magic tee and an unmodulated carrier to enter a second input branch of that magic tee. If this is done, one of the output branches will contain only side bands. This apparatus for eliminating the carrier may be used independently or one of the devices may be attached to each of the output branches of the transmitting magic tee as shown in Fig. 1.

Although we have shown and described specific embodiments of our invention, we are aware that other modifications thereof are possible. Our invention, therefore, is not to be restricted except insofar as is necessitated by the prior art and the spirit of the invention.

We claim as our invention:

1. In combination: a waveguide hybrid junction, a signal modulated carrier generator connected to a first branch of said waveguide hybrid junction, and a noise modulated carrier generator connected to a second branch of said waveguide hybrid junction.

2. In combination: a waveguide hybrid junction, a signal modulated carrier generator connected to a first branch of said waveguide hybrid junction, a noise modulated carrier generator connected to a second branch of said waveguide hybrid junction, means for transmitting oscillations on a first frequency in response to the oscillations emitted from a third branch of said waveguide hybrid junction and means for transmitting oscillations on a second frequency in response to the oscillations emitted from a fourth branch of said waveguide hybrid junction.

3. In combination: a hybrid junction having a plurality of branches, a noise modulated carrier connected to a first branch of said hybrid junction, a signal modulated carrier connected to a second branch of said hybrid junction, and apparatus connected to a third branch and to a fourth branch of said hybrid junction, said apparatus being capable of transmitting oscillations in response to the oscillations present in said third branch and said fourth branch.

4. Apparatus for communicating secretly comprising a transmitting station and a receiving station, said transmitting station comprising a first hybrid junction, a noise modulated carrier generator connected to a first branch of said first hybrid junction, a signal modulated carrier generator connected to a second branch of said hybrid junction, a first transmitter connected to a third branch of said hybrid junction, a second transmitter connected to a fourth branch of said hybrid junction, said second transmitter being capable of transmitting on a different frequency from that of said first transmitter, said receiving station comprising a hybrid junction, a demodulator connected to a first branch of said second hybrid junction, a dry load connected to a second branch of said second hybrid junction, a first receiver attached to a third branch of said hybrid junction, said first receiver being capable of receiving radiations emitted by said first transmitter, a second receiver attached to a fourth branch of said hybrid junction, said second receiver being capable of receiving radiations transmitted by said second transmitter.

5. Apparatus for communicating secretly comprising a transmitting station and a receiving station, said transmitting station comprising a first waveguide hybrid junction, a noise modulated carrier generator connected to a first branch of said first waveguide hybrid junction, a signal modulated carrier generator connected to a second branch of said waveguide hybrid junction, a first transmitter connected to a third branch of said waveguide hybrid junction, a second transmitter connected to a fourth branch of said waveguide hybrid junction, said second transmitter being capable of transmitting on a different frequency from that of said first transmitter, said receiving station comprising a waveguide hybrid junction, a demodulator connected to a first branch of said second waveguide hybrid junction, a dry load connected to a second branch of said second waveguide hybrid junction, a first receiver attached to a third branch of said waveguide hybrid junction, said first receiver being capable of receiving radiations emitted by said first transmitter, a second receiver attached to a fourth branch of said waveguide hybrid junction, said second receiver being capable of receiving radiations transmitted by said second transmitter.

6. In combination: a waveguide hybrid junction, an oscillation generator connected to a first branch and a second branch of said waveguide hybrid junction, a noise modulator connected between said generator and the first branch of said waveguide hybrid junction and a signal modulator connected between said generator and the second branch of said waveguide hybrid junction.

7. In combination: a waveguide hybrid junction, an oscillation generator connected to a first branch and a second branch of said waveguide hybrid junction, a noise modulator connected between said generator and the first branch of said waveguide hybrid junction and a signal modulator connected between said generator and the second branch of said waveguide hybrid junction, a first antenna connected to a third branch of said waveguide hybrid junction and a second antenna connected to a fourth branch of said waveguide hybrid junction.

8. In combination: a junction of four waveguide branches characterized by the fact that there is no direct coupling between electrically opposite arms while there is direct coupling between electrically adjacent arms, a signal modulated carrier generator connected to a first branch of said junction, and a noise modulated carrier generator connected to a second branch of said junction.

EDWARD J. DUCKETT.
GEORGE A. KLOTZBAUGH.

References Cited in the file of this patent

UNITED STATES PATENTS

| Number | Name | Date |
|---|---|---|
| 1,472,218 | Hammond | Oct. 30, 1923 |
| 1,753,353 | Steinberg | Apr. 8, 1930 |
| 2,083,653 | Kasemann | June 15, 1937 |
| 2,134,850 | Baesecke | Nov. 1, 1938 |
| 2,400,950 | Purington | May 28, 1946 |
| 2,405,599 | Mitchell | Aug. 13, 1946 |
| 2,406,841 | Levy | Sept. 3, 1946 |
| 2,441,615 | Brown | May 18, 1948 |
| 2,445,896 | Tyrell | July 27, 1948 |
| 2,454,907 | Brown | Nov. 30, 1948 |
| 2,477,428 | Sprague et al. | July 26, 1949 |
| 2,486,001 | Bruck et al. | Oct. 25, 1949 |
| 2,509,789 | Sprague | May 30, 1950 |
| 2,511,899 | Brown | June 20, 1950 |
| 2,556,677 | Chapman | June 12, 1951 |

FOREIGN PATENTS

| Number | Country | Date |
|---|---|---|
| 288,714 | Great Britain | Apr. 12, 1928 |